United States Patent [19]

McGowan

[11] Patent Number: 5,796,255
[45] Date of Patent: Aug. 18, 1998

[54] ELECTRONIC CONTROLLED, SPARK FREE BOOSTER CABLE SYSTEM

[76] Inventor: Ricky Dean McGowan, 13827 Cane Dr., San Antonio, Tex. 78233

[21] Appl. No.: 633,852

[22] Filed: Apr. 6, 1996

[51] Int. Cl.[6] ............................................. H02J 7/00
[52] U.S. Cl. ............................................. 324/429; 340/636
[58] Field of Search ........................ 340/636; 324/435, 324/429; 320/48, 25, 26

[56] References Cited

U.S. PATENT DOCUMENTS

| | | | |
|---|---|---|---|
| 4,217,534 | 8/1980 | Cole | 320/25 |
| 4,366,430 | 12/1982 | Wright | 320/25 |
| 4,871,957 | 10/1989 | Taranto | 320/26 |
| 4,969,834 | 11/1990 | Johnson | 320/25 |
| 5,103,155 | 4/1992 | Joannou | 320/25 |

*Primary Examiner*—Christine K. Oda
*Attorney, Agent, or Firm*—David G. Henry

[57] ABSTRACT

A device for safely transferring electrical energy from a charged battery of an operable vehicle to a discharged battery of a disabled vehicle. The device consists of two pairs of jumper cables electrically connected to an intervening safety circuit. When the jumper cables are connected to their respective batteries, the safety circuit prevents reverse-polarity bridging of the charged and discharged batteries, thereby preventing explosions or improper current flow that could injure the operator or damage either battery. The safety circuit provides a sensory indication to the user when the cables are properly connected and allows the operator to manually enable the sub-circuitry that completes the full circuit between the two batteries. The sub-circuitry that completes the full circuit between batteries, in combination with the circuit's housing, operates to eliminate dangerous sparking that typically attends the connection of the terminals of vehicle batteries.

2 Claims, 3 Drawing Sheets

ELECTRONIC CONTROLLED, SPARK FREE BOOSTER CABLE SYSTEM

BACKGROUND OF THE INVENTION

The present invention relates to a safety battery booster system for use in boosting the power of a discharged vehicle battery with a sufficiently charged vehicle battery and, more particularly, a safety circuit that prevents reverse-polarity battery connections and eliminates the sparking that usually accompanies the connection of such batteries.

It is common for vehicle batteries to discharge to the point where they will not start the vehicle's engine. A common solution to this problem is to place another vehicle's charged battery in parallel with the discharged battery through the use of "jumper" cables, effectively boosting the energy of the discharged battery. This solution can be dangerous for the unsophisticated or careless motorist, especially if the batteries are connected in reverse-polarity. An explosion, personal injury to the operator, or electrical damage to either battery can result. Even if the connection is accomplished with the proper polarity, the current flowing from the charged battery when the connection is made or broken typically causes sparking. Such sparking can itself injure the operator and, more seriously, can ignite the hydrogen gas emitted from many lead acid batteries when current flows into or out from them, thereby causing an explosion.

The prior art, such as is shown in U.S. Pat. No. 4,006,953 of W. E. Puckett, discloses the use of a thermal switch inserted in the cable connected to the positive terminal of the charged battery to limit the current emanating from that battery. However, while that technique might limit the damage resulting from a reverse-polarization connection, no indication is given to the operator that the polarization of the connection is improper or that boosting cannot occur due to the faulty connection.

Puckett also discloses an apparatus for eliminating sparking around the charged battery. He teaches that the booster cable system can be permanently attached to the terminals of the charged battery, thereby ensuring that any sparking caused by cabling or uncabling will occur at the far end of the system near the discharged battery. This reduces the risk of an explosion of hydrogen gas because such gas will not be present around the discharged battery, but such a technique is ineffective when the booster system cannot be permanently cabled to a known charged battery. Moreover, sparking near the uncharged battery still presents other hazards to the operator.

The prior art has not taught a safety battery booster system that prevents reverse-polarized connection, indicates to the operator when the connection is properly polarized, and prevents sparking at both the charged and the uncharged battery when the connection is made.

SUMMARY OF THE INVENTION

The present invention is a safety battery booster system which prevents a reverse-polarized connection. The system utilizes a safety circuit which detects the polarity of a connection to each battery and provides a sensory indication of whether the connection is correct. A solenoid is provided which completes the electrical path between the booster battery and the discharged battery when the system is properly connected.

DETAILED DESCRIPTION OF THE PREFERRED EMBODIMENT

Figure 1:
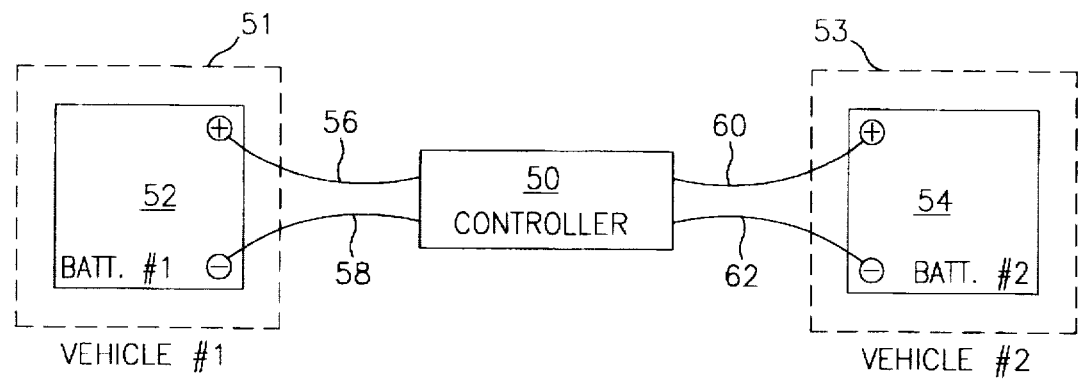
FIG. 1 is a block diagram illustrating the relationship of the present inventive system with the controller positioned between a first and a second battery.

FIG. 1 is a block diagram showing the relationship of the present inventive system with the controller 50 positioned between and attached to a battery 52 in first vehicle 51 and a second battery 54 in a second vehicle 53. For the purposes of this description battery 52 will sometimes be referred to as the dead or discharged battery. Battery 54 is referred to as the live or booster battery.

One end of the cable 56 (normally colored red) extends from and is releasably connected to the positive terminal of battery 52 while the second end of cable 56 is attached to controller 50 as will be further discussed below. One end of cable 58 (normally colored black) extends from and is releasably connected to the negative terminal of battery 52 while the second end of cable 58 is attached to controller 50. Thus the controller may be electrically and physically connected to the dead battery.

In a like manner cable 60 (normally colored red) is connected to controller 50 and extends to and is releasably connected to the positive terminal of booster battery 54 and cable 62 (normally colored black) is connected to controller 50 and extends to and is releasably connected to the negative terminal of booster battery 54. Because of the safety circuit of controller 50 of the present inventive system, battery 52 is not electrically connected to battery 54 until the operator activates a normally open switch on controller 50.

Figure 2:
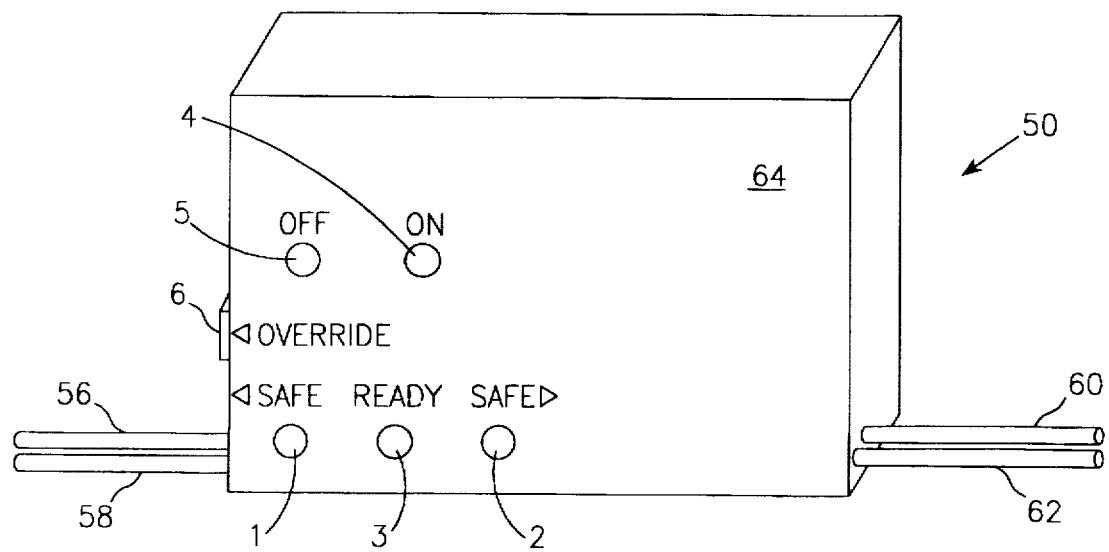
FIG. 2 illustrates a perspective view of the controller of the present inventive system.

FIG. 2 illustrates a perspective view of controller 50 and shows the face panel 64 with various switches or push buttons and lights which will be described below. When cables 56 and 58 are physically and electrically connected to battery 52, a first light or "safe" light 1 will be illuminated. If the cables are improperly connected, i.e., reversed, or if there is not an adequate electrical connection, light 1 will not illuminate. Should cables 56 and 58 be adequately physically connected to battery 52 so as to carry the electrical current from the battery to controller 50, but the cables are reversed with cable 56 on the negative terminal and cable 58 on the positive terminal, an audible alarm or beeper will sound indicating a reverse polarity condition. The operator is thereby warned both visually and audibly to correct the cable connections to the dead battery. It may be possible that battery 52 is so completely discharged that there is not sufficient electrical energy to illumine light 1 even if the connections are correct. In such a case the operator may activate the system of the present invention by utilizing an override option as will be discussed below. Only when the operator is confident that the cables are properly connected should the override be used.

Once the system is properly connected to the dead battery 52, the operator may proceed to correct the system to the booster battery 54. As was discussed above with cables 56 and 58, proper connection of cables 60 and 62 to battery 54 will illumine a second light or safe light 2. Improper connection will result in an audible alarm or beeper sounding and light 2 not illuminating.

In operation, when the system is properly connected physically and electrically to both batteries 52 and 54, the operator knows that he or she may safely activate the electrical connection between the two batteries. Normally, the operator will start the second vehicle housing the booster battery 54 so that it is not drained during the boosting operation. After the second boostering vehicle is running and battery 54 is being charged by the second vehicle's electrical system, the operator engages the controller 50 by pressing "on" button or switch 4.

Engagement of switch 4 will result in the illumination of a third light or "ready" light 3 which signifies that the first vehicle housing the dead battery 52 may be started. As is often the case, the first vehicle may not immediately kick over or start. The operator may have to wait a few minutes to charge dead battery 52 sufficiently to enable the first vehicle to start.

Once the disabled vehicle is started, the operator presses "off" button 5 on controller 50. Button or switch 5 is a normally closed switch which opens when pressed and electrically disconnects batteries 52 and 54 through the safety circuit in controller 50. After switch 5 is pressed and the controller is off, the operator may safely physically disconnect the cables 56, 58, 60 an 62 from their respective batteries.

As previously stated, if battery 52 is totally discharged (or even removed and cables 56 and 58 are connected to another electrical system), an override option is available. Controller 50 has an override switch 6 which is normally open. Engagement of switch 6 will supply gate current to the silicon controlled rectifier (S.C.R.) in controller 50 directly from the main current source allowing the S.C.R. to conduct through the solenoid, closing the contacts and completing the electrical connection between battery 52 and 54, as will be discussed further below.

Figure 3:
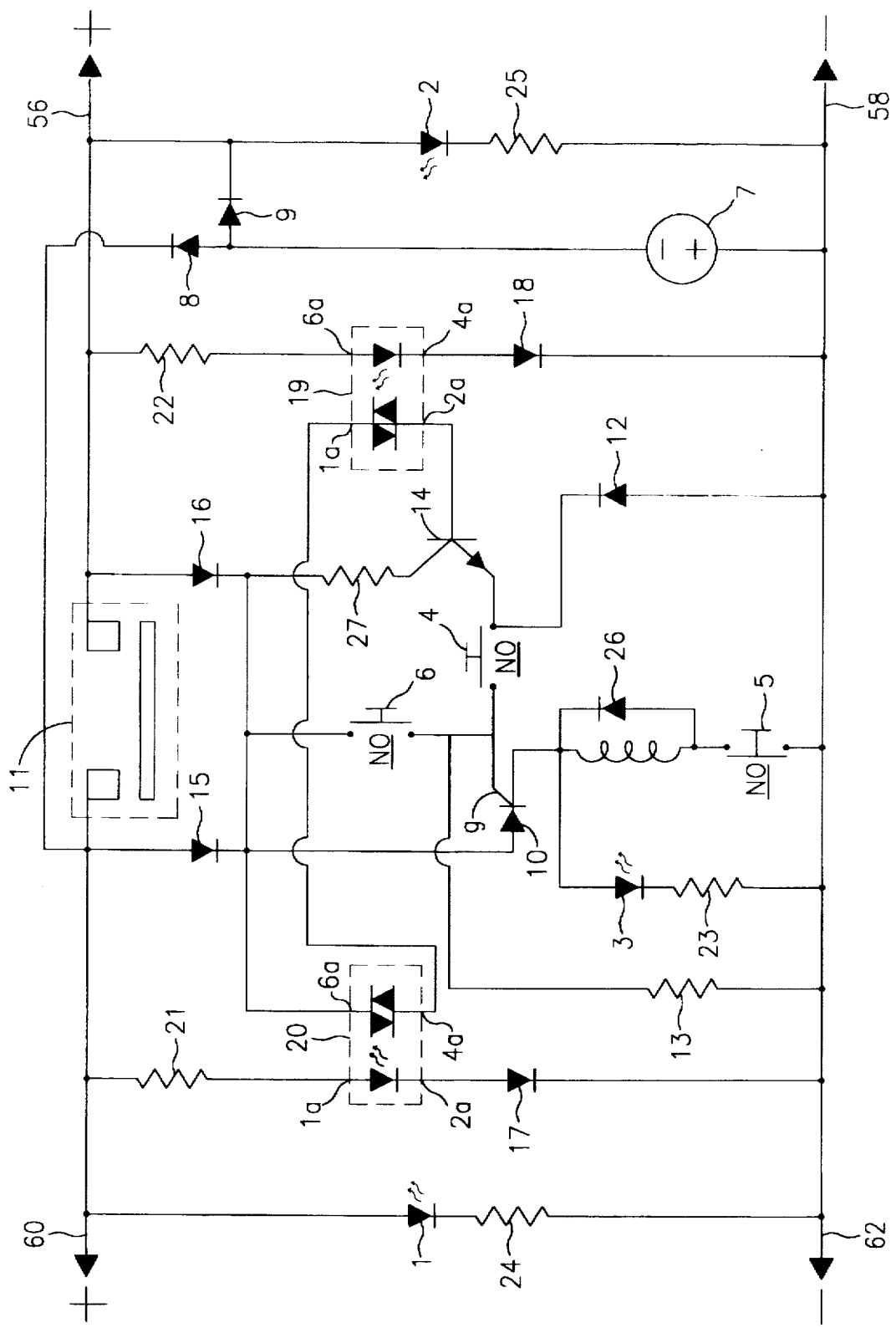
FIG. 3 is an electrical schematic of one embodiment of the present inventive system.
Figure 4:
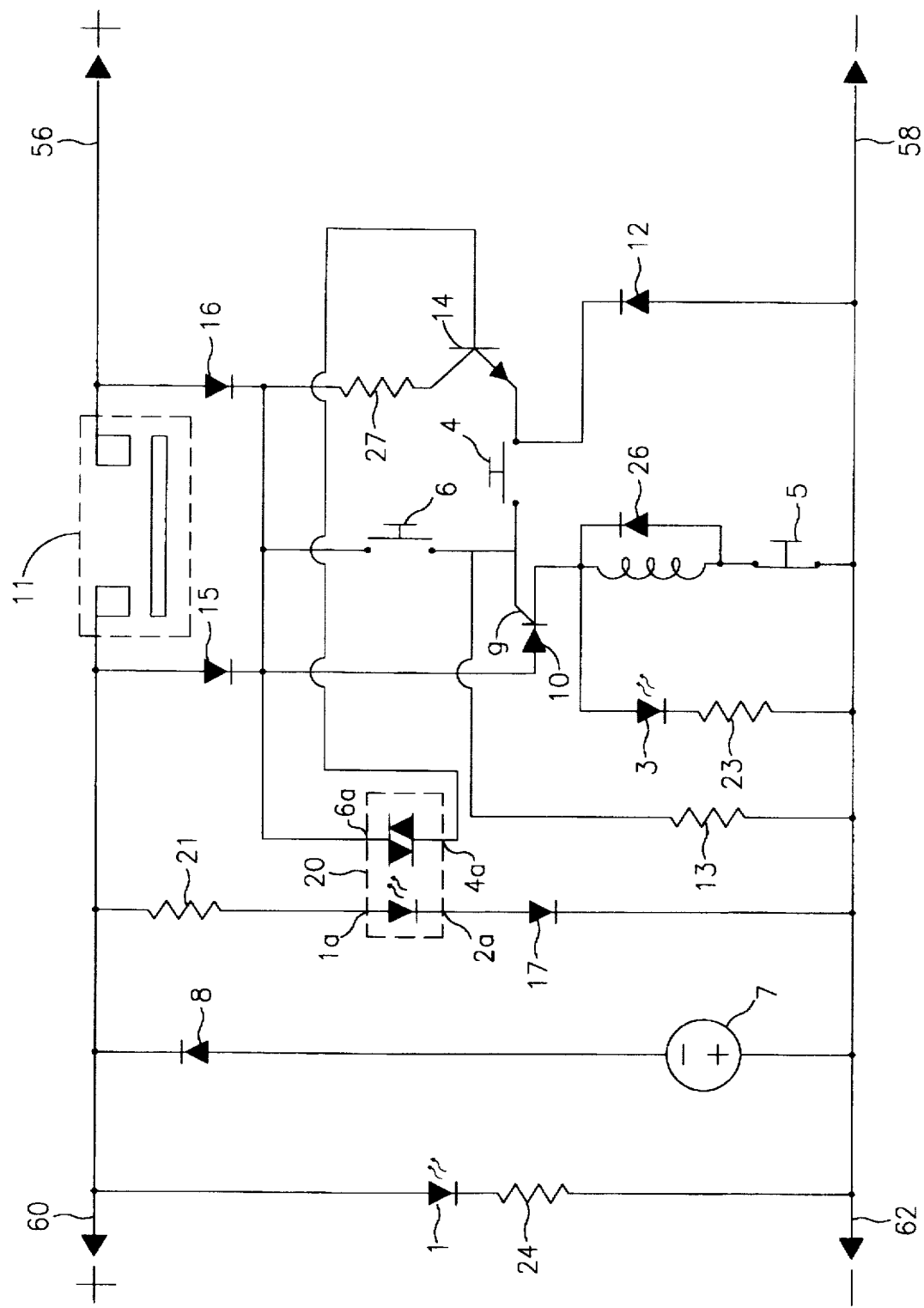
FIG. 4 is an electrical schematic of an alternative embodiment of the present inventive system.

FIGS. 3 and 4 illustrate electrical schematics of the circuit in controller 50. FIG. 3 is the typical circuit used when the system is a portable unit as contrasted with an item of original equipment manufacture. The circuit of FIG. 3 has a second optic coupler and reads two inputs. The circuit of FIG. 4 would be used in a unit permanently installed with the cables 60 and 62 hardwired in correct polarity with the vehicle's electrical system. The second optic coupler is not needed to ensure proper connection by the operator to the vehicle's battery or electrical system.

Turning to FIG. 3, a first embodiment of the controller circuit may be seen and understood.

Specific diodes 8 and 9 control the power to the beeper 7 and in the event that either battery cable is connected improperly the beeper 7 will sound. If the batteries are connected correctly they will block the current from reaching the beeper 7.

Diode 26 is used to protect S.C.R. 10 from high voltage spikes when off switch 5 is opened to disengage the controller 50.

Diode 12 is used to place transistor 14 in a clamped down condition.

Diodes 17 and 18 work with resistors 21 and 22 respectively to protect the optic couplers 19 and 20. They provide a polarity current protection network.

Optic couplers 19 and 20 provide for isolation and correct connection monitoring. When the batteries are correctly connected, the L.E.D. inside, connected to pins 1a and 2a will light up. This will allow the power applied to pin 6a to be transferred to pin 4a. If the batteries are incorrectly connected there will be no transfer of power through the device.

Diodes 15 and 16 provide power to the network to engage the solenoid 11 only if the batteries are connected correctly. Even if all other safety features are ignored they will still prevent the controller from working.

Transistor 14 is used as a current amplifier to provide sufficient current to energize the gate g of S.C.R. 10.

S.C.R. 10 is at the heart of the controller. The S.C.R. is used to prevent engagement of the solenoid 11 until all safety conditions are met. It passes the voltage to the solenoid 11 after the gate g is turned by the "on" switch 4. Or in the case of total battery failure of the first vehicle, when the override switch 6 is depressed. The S.C.R. conducts until voltage is removed from it's cathode by depressing the "off" switch 5.

The operation of the present inventive system will now be discussed with reference to FIGS. 3 and 4.

When connection to battery 54 is accomplished, voltage is applied across L.E.D. 1, resistor 24, resistor 21, diode 17 and optic coupler 20. If connection is the correct polarity, current will flow through L.E.D. 1, resistor 24 causing L.E.D. 1 to light indicating proper connection. In addition current will flow through resistor 21, optic coupler 20 and diode 17 causing the internal L.E.D. in the optic coupler 20 to light, switching on the triac section of the coupler. If the connection is incorrect (reversed polarity) L.E.D. 1 will not light, also the internal L.E.D. of the optic coupler 20 will not light keeping the triac section switch off. During the reversed polarity condition, current flows through the diode 8 and beeper 7 producing an audible warning of the incorrect connection.

When connection to battery 52 is accomplished, voltage is applied across L.E.D. 2, resistor 25, resistor 22, diode 18 and optic coupler 19. If connection is correct polarity, current will flow through L.E.D. 2, resistor 25 causing L.E.D. 2 to light, indicating proper connection. In addition current will flow through resistor 22, optic coupler 19 and diode 18 causing the internal L.E.D. and the optic coupler 19 to light, switching on the triac section of the optic coupler 19. If the connection is incorrect (reversed polarity) L.E.D. 2 will not light, also the internal L.E.D. of the optic coupler will not light, keeping the triac section switched off. During the reversed polarity condition, current flows through diode 9 and beeper 7 producing an audible warning of the incorrect connection.

When both the first and second vehicle are properly connected, L.E.D. 1, 2 will light along with the internal L.E.D.s of optic couplers 19 and 20. The internal L.E.D.s of the optic couplers 19 and 20, when illuminating, switch on the triac sections, which are connected in series, between the main current source supplied by isolation diodes 15 and 16 and transistor 14. Resistor 27 limits current drawn by the transistor 14.

When "on" switch 4 is closed, current flows from transistor 14 to the gate g of S.C.R. 10 that is connected in series between the main current source supplied by isolation diodes 15 and 16, coil of the solenoid 11 and switch 5 causing the contacts of the solenoid 11 to close, completing the connection between the batteries 52 and 54 of vehicles 51 and 53 in illuminating ready L.E.D. 3. Current will continue to flow through S.C.R. 10 and the solenoid 11 coil even though switch 4 is opened due to the internal function of the S.C.R.

When the "off" switch 5 is depressed it removes the ground path from the solenoid 11 and S.C.R. 10. This action shuts off the system and turns off the boost ready light 3. With the controller 50 disengaged there is no electrical connection between vehicle 51 and vehicle 53, which eliminates any chance for sparks or damage to any vehicle.

The override option may be used if the battery of either vehicle has been removed or severely discharged. The override switch 3 must be used to override the safety controller circuit. Closing switch 6 supplies gate current to the S.C.R. 10 directly from the main current source supplied by isolation diodes 15 and 16. This causes the S.C.R. 10 to conduct current through the solenoid 11 coil causing the contacts to close and completing the electrical connections between the two batteries.

When the "off" switch 5 is depressed it removes the ground path from the solenoid 11 and S.C.R. 10. This action shuts off the system and turns off the boost ready light 3. With the controller circuit disengaged there is no electrical connection between the vehicles which eliminates any chance for sparks or damage to either vehicle.

While the invention has been described in connection with a preferred embodiment, it is not intended to limit the invention to the particular form set forth, but, on the contrary, it is intended to cover alternatives, modifications, and equivalents, as may be included within the spirit and scope of the invention as defined by the appended claims.

I Claim:

1. An electrical safety circuit for use in a battery booster system, comprising:

circuit terminals for connecting to positive and negative battery terminals of a first battery and a second battery;

means for detecting the polarity of a connection of said system to said first battery and providing sensory indications of said polarity;

means for detecting the polarity of a connection of said system to said second battery and providing sensory indications of said polarity;

switching means for completing an electrical path between said terminals of said first and second batteries;

means for automatically disabling said switching means when said connection to either said first or second battery is of reverse polarity or not present;

means for indicating when contacts of said switching means have closed said circuit;

an override switch for manually overriding said automatic switching means disabling means, said override switch permitting the operation of said switching means even though said second battery is completely discharged; and a disable switch for manually disabling said switching means.

2. A safety booster cable system for transferring electrical power from the battery of a disabled first vehicle to the servicing battery of a second vehicle comprising:

a first pair of cables for electrically connecting to said battery of said first vehicle;

a second pair of cables for electrically connecting to said battery of said second vehicle;

the electrical safety circuit of claim 1 connecting said two cable pairs; and a housing for said electrical safety circuit.

* * * * *